(12) United States Patent
Kienzle et al.

(10) Patent No.: US 6,375,264 B1
(45) Date of Patent: Apr. 23, 2002

(54) BACKREST FOR A VEHICLE

(75) Inventors: Armin Kienzle, Rottenburg; Christian Wobst, Horb; Ulrich Ebbeskotte, Althengstatt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/617,875

(22) Filed: Jul. 17, 2000

(30) Foreign Application Priority Data

Jul. 16, 1999 (DE) ........................................ 199 33 430

(51) Int. Cl.⁷ ................................................ A47C 1/10
(52) U.S. Cl. ...................................................... 297/403
(58) Field of Search ................................ 297/403, 391, 297/408; 280/751; 296/63

(56) References Cited

U.S. PATENT DOCUMENTS

| | | | | |
|---|---|---|---|---|
| 4,576,411 A | * | 3/1986 | Kitamura | 297/403 X |
| 4,623,166 A | * | 11/1986 | Andres et al. | 297/403 X |
| 4,711,494 A | * | 12/1987 | Duvenkamp | 297/403 |
| 4,807,934 A | * | 2/1989 | Sakakibara et al. | 297/403 |
| 5,669,668 A | * | 9/1997 | Leuchtmann | 297/403 X |
| 5,681,079 A | * | 10/1997 | Robinson | 297/403 X |

FOREIGN PATENT DOCUMENTS

| | | | | |
|---|---|---|---|---|
| DE | 3545142 | | 6/1987 | |
| DE | 3600411 | * | 7/1987 | ................. 297/403 |
| DE | 4030949 | | 4/1992 | |
| DE | 4243192 | * | 5/1993 | ................. 297/403 |
| DE | 4220222 | | 8/1993 | |
| DE | 19705867 | | 4/1998 | |

* cited by examiner

Primary Examiner—Jerry Redman
(74) Attorney, Agent, or Firm—Crowell & Moring LLP

(57) ABSTRACT

A backrest for a vehicle seat, in particular a rear seat, has a head restraint which can be pivoted away from an approximately vertical operative position into an approximately horizontal inoperative position on the rear side of the backrest. The head restraint has a head cushion and at least one supporting rod which holds the head cushion and passes through a slot cutout in the backrest and is fixed to a pivoting shaft arranged in the backrest. In order to avoid openings on the upper side of the backrest for the passage of the supporting rod, the slot cutout is arranged in a rear wall of the backrest, and the supporting rod is designed in such a manner that it emerges out of the head cushion towards the rear side of the backrest with a curved rod section running concentrically to the pivoting shaft, and extends as far as the pivoting shaft with a straight rod section which is angled off at the end of the curved rod section.

13 Claims, 1 Drawing Sheet

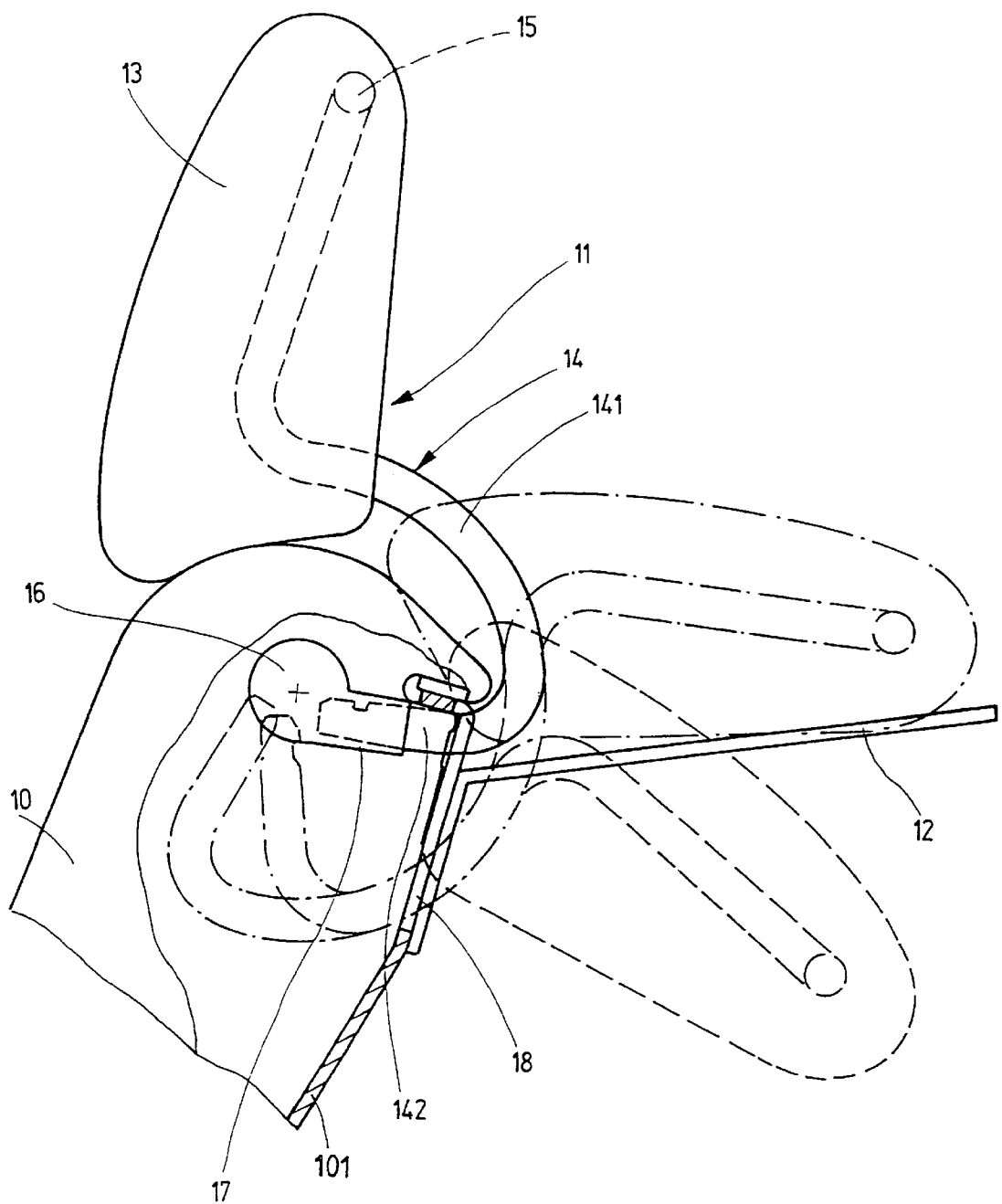

BACKREST FOR A VEHICLE

BACKGROUND AND SUMMARY OF INVENTION

This application claims the priority of German patent document 19933430.7, filed Jul. 16, 1999, the disclosure of which is expressly incorporated by reference herein.

The invention relates to a backrest for a vehicle seat, in particular a rear seat having a head restraint which can be pivoted away from an approximately vertical operative position into an approximately horizontal inoperative position on a rear side of the backrest and which has a head cushion and at least one supporting rod which holds the head cushion passes through a slot-like cutout in the backrest and is fixed to a pivoting shaft arranged in the backrest.

In the case of a known backrest of this type (DE 42 20 222 C1), two supporting rods which hold the head cushion run outside the head cushion essentially in a semicircle which is curved away from the backrest and is concentric to the shaft axis of a bent pivoting spindle held transversely within the backrest. The supporting rods are integrally formed on the bent section of the shaft at their end facing away from the head restraint. In order to make the pivoting movement of the head restraint possible, two parallel, slot-like cutouts, through each of which a supporting rod passes, are provided in the upper side of the backrest. During the pivoting of the head restraint, the supporting rods move along the cutouts.

Openings on the upper side of the backrest impair the visual overall impression. In addition, relatively small objects which are deposited, for example, on the rear parcel shelf, can easily fall into these openings and obstruct or even impair the pivoting mechanism. Long-term deposition of dirt in the pivoting mechanism through the openings in the upper side of the backrest cannot be avoided.

The invention is based on the object of, in the case of a backrest of the type mentioned at the beginning, improving the head restraint in such a manner that openings on the upper side of the backrest are avoided.

According to the invention, this object is achieved by providing a backrest of the above-noted type, wherein the supporting rod emerges out of the head cushion towards the rear side of the backrest with a curved rod section running concentrically to the pivoting shaft, and extends as far as the pivoting shaft with a straight rod section angled off at an end of the curved rod section.

The backrest according to the invention has the advantage that the slots necessary for the pivoting of the head restraint are shifted onto the rear side of the backrest and therefore, because of the unity of the backrest in the upper backrest region, a visually improved overall impression is obtained. Since the backrest is generally inclined rearwards and the slots therefore run slightly obliquely with respect to the vertical, the risk of dirt accumulation is substantially reduced. It is equally difficult for objects to be able to penetrate unintentionally into the cutouts.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a part sectional side view of a backrest having a head restraint which can be folded away, constructed embodiment according to a preferred of the present invention.

DETAILED DESCRIPTION OF THE DRAWINGS

The backrest, part of which is illustrated in the drawing in side view and partially cut away, for a rear seat of a car, as an exemplary embodiment of a general vehicle seat, is provided with a head restraint 11 which can be pivoted away from an approximately vertical operative position +into an approximately horizontal inoperative position towards the rear side of the backrest 10. The vertical operative position is illustrated by an unbroken line in the drawing and the approximately horizontal inoperative position is illustrated by dash-dotted lines.

In the case of the design of the backrest 10 as a rear-seat backrest, in the inoperative position the head restraint 11 rests on a covering panel 12 which covers a luggage space behind the backrest 10, for example, in a recess in the said backrest. If the backrest 10 is designed such that it can be folded forwards in a known manner in order to increase the volume of the luggage space, the head restraint has a further pivoted-away position as is illustrated in the drawing by dashed lines. The head restraint 11 can only take up this pivoted-away position if the backrest 10 is folded forwards and the head restraint 11 thereby emerges out of the region of the covering panel 12.

The head restraint 11 has a head cushion 13 and at least one supporting rod 14 holding the head cushion 13. Two parallel supporting rods 14, which are arranged at a transverse distance from each other and are combined by means of a transverse web 15 to form a single-piece bracket, are preferably used. The supporting rod 14 is secured to a pivoting shaft 16 which is held rotatably in the interior of the backrest 10. In this arrangement, the supporting rod 14 emerges from the head cushion 13 towards the rear side of the backrest 10 with a curved rod section 141 running concentrically to the pivoting shaft 16, and extends as far as the pivoting shaft 16 with a straight rod section 142 which is angled off at the end of the curved rod section 141. The straight rod section runs approximately radially to the pivoting shaft 16 and is, as is illustrated schematically in the drawing, inserted in a positive-locking manner into a holder 17, which is connected fixedly to the pivoting shaft 16, and is latched in this holder 17.

For the passage of the supporting rod 14 towards the pivoting shaft 16, a slot-shaped cutout 18 is provided in the rear wall 101 of the backrest 10, in which cutout the supporting rod 14 is moved along during the pivoting of the head restraint 11. The length of the cutout 18 is dimensioned in such a manner that after the backrest 10 is folded down away from the covering plate 12, the head restraint 11 can assume its lower pivoted-away position which is illustrated by dashed lines in the drawing and in which it bears with the lower side of the head cushion 13 against the rear wall 101 of the backrest 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Backrest for a vehicle seat comprising a head restraint which can be pivoted away from an approximately vertical operative position into an approximately horizontal inoperative position on a rear side of the backrest and which has a head cushion, and at least one supporting rod, which holds the head cushion, passes through a slot cutout in the backrest and is fixed to a pivoting shaft arranged in the backrest, wherein the slot cutout, in which the supporting rod is moved along during the pivoting movement of the head restraint, is arranged in a rear wall of the backrest, and wherein the supporting rod emerges out of the head cushion towards the rear side of the backrest with a curved rod section running concentrically to the pivoting shaft, and extends as far as the pivoting shaft with a straight rod section angled off at an end of the curved rod section.

2. Backrest according to claim 1, wherein the at least one supporting rod can be inserted and latched in a positive-locking manner into a holder with a free end of the straight rod section, and wherein the holder is connected rigidly to the pivoting shaft held rotatably in the backrest.

3. Backrest according to claim 2, wherein two supporting rods are provided, which said supporting rods are arranged at a transverse distance from each other and are combined with a transverse web running in the head cushion, to form a single-piece bracket.

4. Backrest according to claim 3, wherein the head restraint rests in the inoperative position on a covering panel which is arranged behind the backrest and is intended for a luggage space.

5. Backrest according to claim 4, wherein the head restraint has a further pivoted-away position in which the head restraint is pivoted beyond the inoperative position, when the backrest is designed to be folded forwards, and bears with a lower side of the head cushion against a rear wall of the backrest.

6. Backrest according to claim 2, wherein the head restraint rests in the inoperative position on a covering panel which is arranged behind the backrest and is intended for a luggage space.

7. Backrest according to claim 2, wherein the head restraint has a further pivoted-away position in which the head restraint is pivoted beyond the inoperative position, when the backrest is designed to be folded forwards, and bears with a lower side of the head cushion against a rear wall of the backrest.

8. Backrest according to claim 1, wherein two supporting rods are provided, which said supporting rods are arranged at a transverse distance from each other and are combined with a transverse web running in the head cushion, to form a single-piece bracket.

9. Backrest according to claim 8, wherein the head restraint rests in the inoperative position on a covering panel which is arranged behind the backrest and is intended for a luggage space.

10. Backrest according to claim 8, wherein the head restraint has a further pivoted-away position in which the head restraint is pivoted beyond the inoperative position, when the backrest is designed to be folded forwards, and bears with a lower side of the head cushion against a rear wall of the backrest.

11. Backrest according to claim 1, wherein the head restraint rests in the inoperative position on a covering panel which is arranged behind the backrest and is intended for a luggage space.

12. Backrest according to claim 11, wherein the head restraint has a further pivoted-away position in which the head restraint is pivoted beyond the inoperative position, when the backrest is designed to be folded forwards, and bears with a lower side of the head cushion against a rear wall of the backrest.

13. Backrest according to claim 1, wherein the head restraint has a further pivoted-away position in which the head restraint is pivoted beyond the inoperative position, when the backrest is designed to be folded forwards, and bears with a lower side of the head cushion against a rear wall of the backrest.

\* \* \* \* \*